(12) United States Patent
Campos et al.

(10) Patent No.: US 9,777,161 B1
(45) Date of Patent: *Oct. 3, 2017

(54) FLUOROALKYLSILANATED MESOPOROUS METAL OXIDE PARTICLES AND METHODS OF PREPARATION THEREOF

(71) Applicant: The United States of America, as represented by the Secretary of the Air Force, Washington, DC (US)

(72) Inventors: Raymond Campos, Dallas, TX (US); Andrew Guenthner, Lancaster, CA (US); Timothy Haddad, Lancaster, CA (US); Joseph M. Mabry, Quartz Hill, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 228 days.

This patent is subject to a terminal disclaimer.

(21) Appl. No.: 14/255,992

(22) Filed: Apr. 18, 2014

Related U.S. Application Data

(63) Continuation-in-part of application No. 13/206,994, filed on Aug. 10, 2011, now Pat. No. 8,741,432.

(60) Provisional application No. 61/373,945, filed on Aug. 16, 2010.

(51) Int. Cl.
  *B32B 5/16* (2006.01)
  *C08K 5/02* (2006.01)
  (Continued)

(52) U.S. Cl.
  CPC .................. *C09C 3/12* (2013.01); *C08K 5/02* (2013.01); *C08K 5/5406* (2013.01); *C08K 7/26* (2013.01);
  (Continued)

(58) Field of Classification Search
  CPC .......... C08K 5/02; C08K 5/5406; C08K 7/26; C08K 9/04; C08K 9/06; C08K 9/12;
  (Continued)

(56) References Cited

U.S. PATENT DOCUMENTS

| 8,580,027 B1 | 11/2013 | Campos et al. |
| 8,741,432 B1 * | 6/2014 | Campos .................... C09C 3/12 |
| | | 427/215 |

(Continued)

OTHER PUBLICATIONS

Steele et al., Inherently superoleophobic nanocomposite coatings by spray atomization, Nano Lett., 2009, vol. 9, No. 1, 501-505.*

(Continued)

*Primary Examiner* — Holly Le
(74) *Attorney, Agent, or Firm* — AFMCLO/JAZ; Chastity Whitaker

(57) ABSTRACT

Treated, mesoporous aggregates comprising a plurality of coated particles that comprise an inorganic oxide core having a surface area of about 50 to about 500 square meters per gram and a shell or coating consisting of an array of fluoroalkyl molecular chains covalently bonded to the core at a density of at least one chain per square nanometer. The aggregates are formed by the chemical attachment of fluoroalkyl-alkylsilanes after exposure to an alkylamine and followed by an extraction to remove any unbound organic material. The dense packing of molecular chains in the fluoroalkyl shell combined with a mesoporous structure imparts a very low surface energy, a very high specific surface area, and surface texture over a wide range of length scales. Such features are highly desirable for the creation of, for example, superhydrophobic and superoleophobic surfaces, separation media, and release films.

17 Claims, 4 Drawing Sheets

(51) Int. Cl.
   *C09C 3/12* (2006.01)
   *C09C 3/06* (2006.01)
   *C08K 9/12* (2006.01)
   *C08K 7/26* (2006.01)
   *C09C 1/30* (2006.01)
   *C08K 5/54* (2006.01)
   *C08K 9/04* (2006.01)

(52) U.S. Cl.
   CPC .............. *C08K 9/04* (2013.01); *C08K 9/12* (2013.01); *C09C 1/3081* (2013.01); *C09C 3/063* (2013.01); *C01P 2002/82* (2013.01); *C01P 2004/50* (2013.01); *Y10T 428/2991* (2015.01); *Y10T 428/2995* (2015.01)

(58) Field of Classification Search
   CPC . C08K 13/02; C09C 1/3081; Y10T 428/2991; Y10T 428/2995
   USPC ........ 428/403, 405, 543; 427/220, 299, 301, 427/372.2, 384, 387
   See application file for complete search history.

(56) References Cited

U.S. PATENT DOCUMENTS

| | | | |
|---|---|---|---|
| 2005/0069708 A1* | 3/2005 | Isarov | C08K 9/06 428/405 |
| 2005/0113488 A1* | 5/2005 | Isarov | C08K 9/06 523/212 |
| 2009/0176097 A1 | 7/2009 | Brown et al. | |
| 2010/0233494 A1* | 9/2010 | Moorlag et al. | 428/447 |
| 2011/0070180 A1* | 3/2011 | Ranade et al. | 424/70.121 |

OTHER PUBLICATIONS

Genzer et al, Molecular Orientation and Grafting Density in Semifluorinated Self-Assembled Monolayers of Mono-, Di-, and Trichloro Silanes on Silica Substrates, Langmuir 2002, 18, 9307-9311.*

Brenier, R., "Bifunctional Surfaces with Superhydrophobic and Plasmonic Properties," J. Phys. Chem. C (2011) 115, 10544-10549.

Ogawa, K., et al., "Development of a Transparent and Ultrahydrophobic Glass Plate," Jpn. J. Appl. Phys., vol. 32, Part 2, No. 4B (Apr. 15, 1993) pp. L614-L615.

Sagiv, J., "Organized Monolayers by Adsorption, I . Formation and Structure of Oleophobic Mixed Monolayers on Solid Surfaces," J. Am. Chem. Soc., 102:1, Jan. 2, 1980, pp. 92-98.

Campos, R., et al., "Fluoroalkyl-Functionalized Silica Particles: Synthesis, Characterization, and Wetting Characteristics," Langmuir, 2011, 27 (16), pp. 10206-10215.

Campos, R., et al., "Superoleophobic Surfaces through Control of Sprayed-on Stochastic Topography," Langmuir, 2012, 28 (25), pp. 9834-9841.

* cited by examiner

FLUOROALKYLSILANATED MESOPOROUS METAL OXIDE PARTICLES AND METHODS OF PREPARATION THEREOF

CROSS-REFERENCE TO RELATED APPLICATIONS

This application is a continuation-in-part of U.S. patent application Ser. No. 13/206,994 filed Aug. 10, 2011, which claims the benefit of U.S. Provisional Application No. 61/373,945 filed Aug. 16, 2010, both of which are herein incorporated by reference in their entirety.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

This invention relates generally to the field of coated filler particles. More particularly, it relates to treated inorganic filler particles for use with polymers and elastomers.

2. Description of the Related Art

Mesoporous inorganic filler particles consisting of aggregated primary particles having a very high hardness, such as fumed and precipitated silica, are widely employed in state-of-the-art elastomeric and polymeric compositions as agents that impart especially high durability. In these compositions, the very small size of the primary particles allows for good optical transparency when the aggregates are sufficiently well-dispersed. On the other hand, particles that are not well-dispersed but remain as aggregates are useful as agents for creating desirable surface textures for improving adhesion or repelling liquids.

The small size of the primary particles also results in a large specific surface area. As a result, the surface characteristics of these particles are paramount in controlling the properties of polymeric and elastomeric formulations into which the particles are incorporated. The surfaces of inorganic particles immediately after production typically contain chemical functionalities that impart undesirable properties to polymeric and elastomeric formulations. Fumed and precipitated silica, for instance, typically feature surfaces with a high concentration of chemically bound silanol groups, in addition to large quantities of physisorbed and chemisorbed water and weakly bound organic impurities. For non-polar polymers and elastomers, and particularly for highly fluorinated polymers and elastomers, the high polarity of such surfaces greatly inhibits the establishment of intimate contact between the inorganic and polymeric or elastomeric components, leading to poor dispersion, mechanical weakness, poor flow properties, and a lack of readily reproducible physical characteristics.

To overcome these limitations, numerous techniques for modifying the surfaces of inorganic particles have been described. For fluorinated polymers and elastomers, a typical approach involves the treatment of silica particles with fluoroalkyl-alkylsilanes. In some instances, a small amount, generally less than 15 parts by weight of fluoroalkyl-alkylsilane per 100 parts by weight of silica, is added. The silane becomes chemically attached to the silica particles, often through formation of a three-dimensional silicate network on the particle surface. These networks minimize the concentration of surface accessible silanols, while also binding fluoroalkyl functional groups to the silane surface, which increases the chemical compatibility of the filler with the fluoropolymer or fluoroelastomer. Although these methods produce inorganic particles that no longer inhibit intimate contact between the filler and the matrix, the limited amount of fluoroalkyl-alkylsilane employed, along with the disorganized nature of the three-dimensional network, results in a surface energy that is typically no lower than around 30 mJ per square meter. For optimal repellency of fats, oils, and greases, a surface energy of 5-30 mJ per square meter is required.

In many cases, fluoroalkyl-alkylsilane treatment of idealized or carefully prepared surfaces of low specific surface area, such as silicon wafers or plate glass, or of high specific surface area (but with a non-discrete aggregated structure), such as a sol-gel, have been utilized. These coated objects, however, cannot be readily deposited onto other substrates by simple techniques such as spraying and thus cannot impart a nanoscale to microscale texture to surfaces not already patterned. In other cases, non-porous silica particles coated with fluoroalkyl-alkylsilanes have been utilized. In these cases, the lack of mesoporosity, as quantified by specific surface area, limits the range of textures that may be imparted to a surface. In particular, textures that are useful for liquid repellency against fluids at pressures beyond a few kPa require roughness at length scales below 100 nm.

In yet other cases, large quantities of fluoroalkyl-alkylsilane have been reportedly mixed with a wide variety of silica particles by non-specific methods, saturating the surfaces with both bound and unbound fluoroalkyl functionality. A more recent approach involves the dispersion of unbound fluorinated organic/inorganic hybrid molecules directly into polymers and elastomers. In such cases, the lack of covalent chemical bonding between the filler and the fluorinated surface treatment causes the treatment to disappear over time due to abrasion or leaching by fluids in contact with the fluorinated polymers or elastomers.

There exists, therefore, a need for a treated filler particle having a well-defined monolayer-like arrangement of fluoroalkyl chains attached to its surface via covalent and thermally stable chemical bonds, such that the surface energy of the particle, for purposes of liquid repellency, is less than 30 mJ per square meter, and such that a formulation incorporating the particles can be coated onto a substrate, with the surface texture of the coating being controlled by conformality with the texture of the particle aggregates so as to further impart desirable liquid repellence characteristics.

SUMMARY OF THE INVENTION

The present invention provides a treated, mesoporous aggregate comprising a plurality of coated particles. The particles comprise an inorganic oxide substrate having the formula $MO_x$, in which M is an oxide of at least one of Li, Be, B, Na, Mg, Al, K, Ca, Sc, Ti, V, Cr, Mn, Fe, Co, Ni, Cu, Zn, Ga, Ge, Rb, Y, Zr, Nb, Mo, Ru, Rh, Pd, Ag, Cd, In, Sn, Sb, Te, Cs, Ba, Ce, Hf, Ta, W, Re, Os, Ir, Pt, Pb, and Bi. The inorganic oxide substrate possesses a specific surface area of at least 50 square meters per gram. At least some of the inorganic oxide substrate comprises a molecular layer coating comprising an approximate monolayer of covalently bonded fluoroalkyl-alkyl fragments. The geometric shape of the treated aggregate is determined by the combination of the arrangement of the particles and the molecular layer coating, with the geometric shape being characterized by an occurrence of concave features of multiple sizes spanning a range from about 5 nm to about 0.001 mm. The molecular layer coating comprises a plurality of —CF$_3$ terminated molecular fragments that are covalently bound to the inorganic oxide substrate such that at least 15 parts by weight of fluorine in the form of —CF—, —CF$_2$—, or —CF$_3$ fragments is covalently bound to 100 parts by weight of the inorganic oxide substrate.

In some embodiments, M is Na, K, Mg, Ca, Ba, Ti, Mn, Fe, Cu, Zn, Zr, Hf, B, and/or Al. In other embodiments, the inorganic oxide substrate further comprises at least one oxide of silicon. In yet other embodiments, the treated aggregate further comprises a surface energy of less than 30 mJ per square meter. In further embodiments, the aggregates are dispersed in a formulation containing a fluoropolymer or fluoroelastomer that may be applied to a substrate and impart a surface texture combining a low surface energy with a well-defined texture extending from nanometer to micrometer length scales.

The present invention further comprises a method for producing a treated aggregate comprising the steps of: a) removing a plurality of physically adsorbed water from the inorganic oxide substrate while leaving intact at least one surface hydroxyl group per square nanometer; b) exposing the inorganic oxide substrate to an atmosphere containing a concentration of alkylamine vapor for a length of time sufficient to cause adsorption onto the surface; c) dispersing the inorganic oxide substrate in a carrier solvent; d) introducing at least a four-fold molar excess of a fluorinated chlorosilane coupling agent; e) stirring the mixture, whereby a portion of the fluorinated chlorosilane coupling agent is covalently bound to the inorganic oxide substrate; f) removing the carrier solvent and excess reagents via centrifugation; g) removing substantially all non-covalently bound fluorinated chlorosilane coupling agent by continuous extraction in an extraction solvent with a neutral to acidic pH to form the treated aggregate; and h) drying the treated aggregate to remove the extraction solvent.

In some embodiments of the method, the fluorinated chlorosilane coupling agent may be heptadecafluoro-1,1,2,2-tetrahydrodecyl)dimethylchlorosilane, tridecafluoro-1,2,2,2-tetrahydrooctyl)dimethyl-chlorosilane, heptadecafluoro-1,1,2,2-tetrahydrodecyl)methyl-dichlorosilane, or mixtures thereof. In other embodiments, the alkylamine vapor is dimethylamine and the time of exposure to the alkylamine vapor is at least 17 hours. In other embodiments, the time utilized for stirring the inorganic oxide substrate and the fluorinated chlorosilane coupling agent in the carrier solvent is at least 72 hours. In further embodiments, the continuous extraction is performed for at least 72 hours.

DETAILED DESCRIPTION OF THE INVENTION

The treated, mesoporous aggregate of the present invention comprises an inorganic oxide substrate having the formula MO$_x$, where the identifier M represents a metal or metalloid or a combination of metal and/or metalloid atoms, and a molecular layer coating of —CF$_3$ terminated molecular fragments covalently bonded to the substrate. The substrate comprises a plurality of particles that possess a specific surface area of at least 50 square meters per gram, with at least one surface hydroxyl group per square nanometer prior to treatment. At least 15 parts by weight of the element fluorine (F), in the form of >CF—, —CF$_2$—, or —CF$_3$ fragments in the coating, is covalently bound to 100 parts by weight of the substrate. The geometric shape of the treated aggregate is determined by the arrangement of the particles comprising the aggregate and the molecular coating and is further characterized by the occurrence of concave features of multiple sizes spanning a range from 5 nm to at least 0.001 mm, with the maximum distance between any two points in the aggregate not exceeding 0.02 mm. The covalent grafting of the fluorinated chlorosilanes onto the surface of the particles imparts hydrophobic and oleophobic properties to the aggregate.

Figure 1:
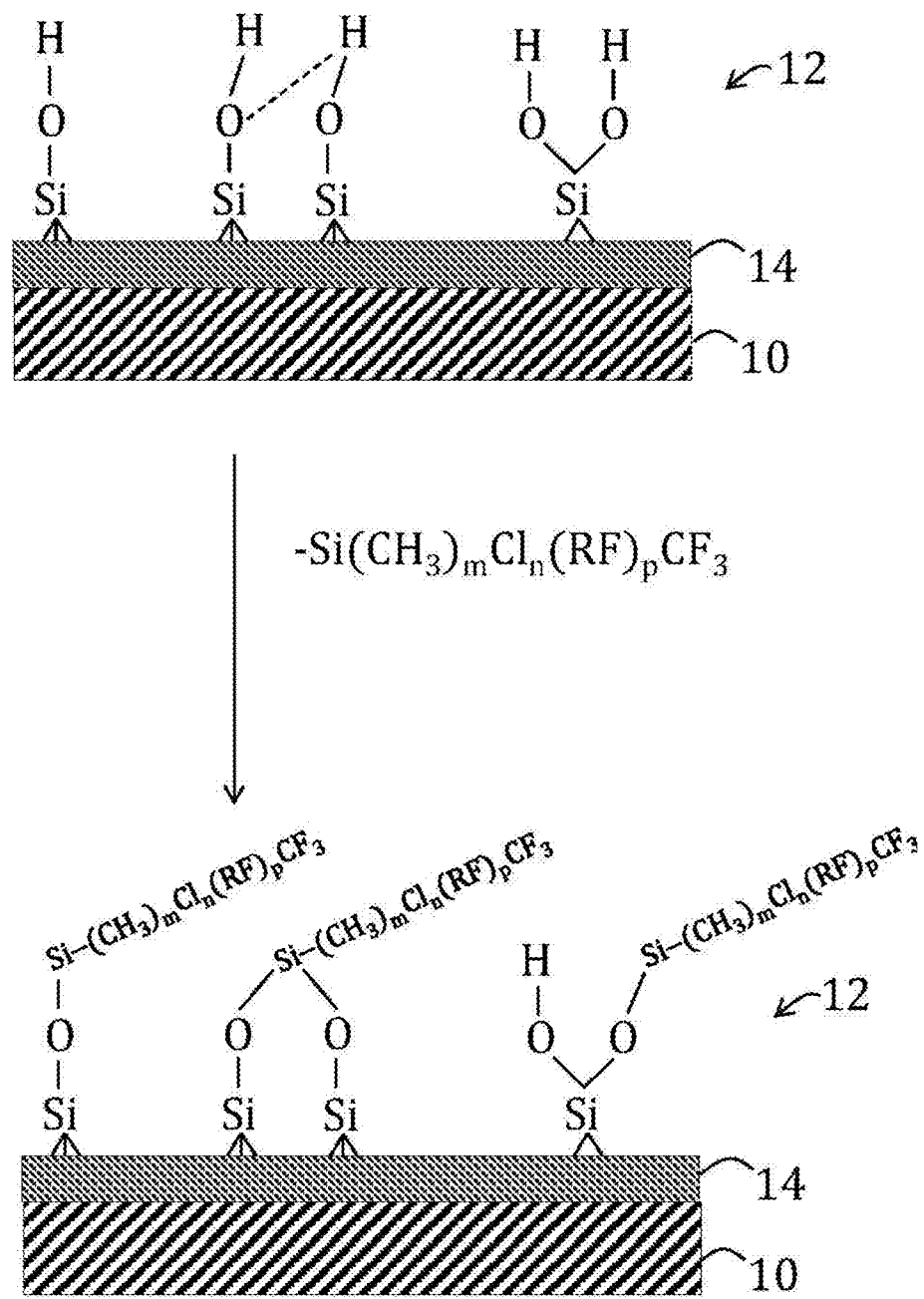
FIG. 1 is a schematic representation of a reaction between silica at the outermost surface layer of atoms of an inorganic oxide particle with a fluorinated chlorosilane according to an embodiment of the present invention.

With reference now to FIG. 1, the particle may comprise an inorganic oxide substrate 10 generally comprises a material with a reactive surface group (e.g., a silanol). In particular, the substrate 10 may comprise a metal or metalloid that is capable of forming an oxide. Examples may include, but are not limited to, alkali and alkaline earth metals, transition metals, poor metals, lanthanides, and metalloids and other oxides of metals or metalloids or combinations thereof. In some embodiments, the substrate is an oxide of silicon. In other embodiments, the substrate 10 is selected from the group consisting of one or more oxides of Li, Be, B, Na, Mg, Al, K, Ca, Sc, Ti, V, Cr, Mn, Fe, Co, Ni, Cu, Zn, Ga, Ge, Rb, Y, Zr, Nb, Mo, Ru, Rh, Pd, Ag, Cd, In, Sn, Sb, Te, Cs, Ba, Ce, Hf, Ta, W, Re, Os, Ir, Pt, Pb, and Bi. In yet other embodiments, the substrate 10 comprises a combination of one or more oxides of Si and oxides of one or more of these metals or metalloids.

In some embodiments, the inorganic oxide particles 12 are about 7 nm in diameter and are composed of a plurality of silica at the outermost surface layer 14 of atoms with surfaces containing 4-5 silanol groups per square nanometer. The particles 12 may be aggregated in a hierarchical fashion and contain a polydispersity of aggregate sizes, with the majority of aggregates spanning no more than 20 micrometers in any direction. The limited overall dimensions of the aggregates are essential for compatibility for simple coating processes. The specific surface area is about 390 square meters per gram.

In further embodiments, the inorganic oxide particles are 22 nm in diameter and are composed of a plurality of silica at the outermost surface layer of atoms. The surfaces of these particles contain from 5 to 12 silanol groups per square nanometer. The particles are aggregated in a hierarchical fashion, with the majority of aggregates spanning no more than 20 microns in any direction. The specific surface area is about 120 square meters per gram. In some embodiments, the substrate closely resembles precipitated silica, such as Hi-Sil® 233 (differentiated only by the presence of less than 5% of other metal oxides or metalloid oxides), and the molecular coating consists of —Si(CH$_3$)$_m$CH$_2$CH$_2$—(CF$_2$)$_n$CF$_3$, in which m=1 or 2 and n=5 or 7.

The present invention also includes a method of producing the treated aggregate, which is schematically illustrated in FIG. 1. The method begins by removing substantially all physically adsorbed water from the high specific surface area inorganic oxide substrate, while leaving intact at least one surface hydroxyl group per square nanometer, followed by exposing the dried inorganic oxide substrate to an atmosphere containing a sufficient concentration of alkylamine vapor for a sufficient time to cause adsorption onto the inorganic oxide substrate surface. The inorganic oxide particles are then dispersed in a carrier solvent, and an excess of fluorinated chlorosilane coupling agent (illustrated as —Si(CH$_3$)$_m$Cl$_n$(RF)$_p$CF$_3$, wherein the subscript m ranges from 0 to 2, the subscript n ranges from 1 to 3, and the subscript p is greater than or equal to 1) (at least a four-fold molar excess) is introduced. In some embodiments, the carrier solvent is moisture free. In other embodiments, where moisture is present in the carrier solvent, it has a neutral to acidic pH. The mixture is stirred to allow a portion of the fluorinated chlorosilane coupling agent to covalently bind to the surface hydroxyl groups on the inorganic oxide particles. The hydroxyl groups on the surface of the metal or metalloid substrate react with the fluorinated chlorosilane coupling agent to form a covalent bond between the substrate and the fluorinated chlorosilane. The method continues with removal of the carrier solvent and excess reagents by centrifugation and removal of substantially all of the non-covalently bonded fluorinated chlorosilane coupling agent by continuous extraction for 1.0 to 1000 hours in an extraction solvent that is suitable for fluoroalkyl-silanes and possesses a neutral to acidic pH to form a treated aggregate according to the present invention. The treated aggregate is then dried to remove substantially all traces of the extraction solvent.

In some embodiments of the method, the inorganic oxide substrate is dried under vacuum sufficiently to remove all physisorbed water from their surface. The procedures for drying will be apparent to one skilled in the art and will vary according to the quantities dried in one batch. A typical drying procedure for 2.0 grams of the inorganic oxide substrate involves maintaining a pressure of no more than 0.001 atm at a temperature of 200° C. for 16 hours. Great care must be taken to avoid exposing the aggregates to any source of water once the removal process is accomplished. Precautions may include using column chromatography to remove all traces of water from any solvents employed subsequent to water removal. Note that in contrast to methods for preparing flat surfaces such as silicon wafers for treatment, no etching procedures are used because etching will severely alter and potentially destroy the inorganic oxide particles of the aggregate.

In other embodiments, the dried aggregates are transferred to a container containing dimethylamine gas at 1.0 atm pressure and allowed to equilibrate for at least 24 hours, followed by suspension in moisture-free chloroform. In one embodiment, (heptadecafluoro-1,1,2,2-tetrahydrodecyl)dimethylchlorosilane ("FDec-MCS"), as obtained from the manufacturer, is introduced to the suspension in a four-fold molar excess compared to silanol, based on the previously determined specific surface area and hydroxyl density of the aggregates. The suspension is then stirred for at least 72 hours in an inert atmosphere.

In other embodiments, a silane having a shorter fluoroalkyl-alkyl chain length than FDec-MCS is used in place of at least some of the FDec-MCS. An example of such a silane is (tridecafluoro-1,1,2,2-tetrahydrooctyl)dimethylchlorosilane ("FOct-MCS"). In yet other embodiments, (heptadecafluoro-1,1,2,2-tetrahydrodecyl)methyldichlorosilane ("FDec-DCS") is used to replace at least some of the FDec-MCS. The fluoroalkyl-alkyl silane selected, however, must contain a sufficient number of —$CF_2$— and —$CF_3$ fragments near its non-bonded terminus to ensure that substances in contact with the treated aggregates encounter a surface with sufficiently low energy. As apparent to one skilled in the art, mixtures of silanes meeting these compositional requirements may also be used in place of the FDec-MCS. For example, a variety of other suitable fluoroalkylsilanes with 3 to 30 carbons may be used. Suitable fluoroalkylsilanes have at least one trifluoromethyl group at its terminus/termini, or having branched chains with trifluoromethyl, pentafluoroethyl, heptafluoropropyl, pentafluorophenyl, or heptafluorotolyl on the terminal groups of branches. In place of the dimethylamine gas, other monoalkylamines, dialkylamines, or trialkylamines, having up to 30 carbon atoms, may also be used.

In further embodiments of the method, the removal of all non-covalently bound species is accomplished by filtration and centrifugation of the aggregates and extraction in a Soxhlet apparatus in dry chloroform, followed by collection and drying. Additional carrier and/or extraction solvent(s) may be selected from, dichloromethane, carbon tetrachloride, other halogenated or non-halogenated hydrocarbons, aliphatic or aromatic ketones, ethers, and nitriles, or any other solvents of sufficient dryness and inertness to avoid interference with the reaction and extraction steps, and to dissolve the reactants and impurities as needed, which may be determined by one skilled in the art. The procedures for the centrifugation, extraction, and drying vary with the size of the aggregate batches being processed and are able to be determined by one skilled in the art. A typical procedure for 2.0 gram batches of aggregates involves centrifugation for 60 minutes, extraction for 72 hours, and drying at 100° C. for 24 hours under no more than 0.001 atm of inert gas.

The following examples and methods are presented as illustrative of the present invention or methods of carrying out the invention, and are not restrictive or limiting of the scope of the invention in any manner.

Example 1: Chlorosilane Selection

Among silane coupling agents, multiple chemical forms are known, including mono-, di-, and tri-chlorosilanes as well as mono-, di-, and tri-alkoxysilanes. It is widely understood that alkoxysilanes should be hydrolyzed (often in-situ) in order to become properly activated for attachment to silica surfaces. It is also understood that the attachment reaction generates water as a byproduct. Because the presently disclosed invention involves methods that are effective only when the concentration of water is minimized (as apparent to one skilled in the art), the surface treatment agent was selected only from among the chlorosilanes. Others have shown that the choice of chlorosilane will impact the final properties of the treated surface; however, based only on these previous findings, the impact of the choice of chlorosilane, particularly as it relates to the need for minimal surface energy, is not obvious. In particular, whereas silanes of higher functionality may attach fluorine-containing chemical functionality at a higher concentration, they may also reduce the homogeneity of the modified surface layer. The relative importance of these factors in controlling the contact angle dynamics on highly textured surfaces in fluoroelastomer composites, for instance, has not been quantitatively determined.

To determine the best choice of chlorosilane, precipitated silica (Hi-Sil® 233, 22 nm diameter, 135 $m^2/g$ specific surface area) was purchased from PPG Industries. Fluorinated silane reagents: FDec-MCS, FDec-DCS, and (heptadecafluoro-1,1,2,2-tetrahydrodecyl)trichlorosilane ("FDec-TCS") were purchased from Gelest™, Inc. Anhydrous dimethylamine was purchased from Aldrich®. The preceding materials were all used as received from the manufacturer. Reagent grade chloroform was purchased from Aldrich® and passed through an activated alumina column prior to use.

The surface functionalization of silica particles was performed using Schlenk line techniques, taking great care to minimize moisture exposure. Silica particles (2.0 g), in a 250 mL round-bottom flask, were initially dried by heating overnight at 200° C. under dynamic vacuum. The dried silica was allowed to cool to room temperature under vacuum, then stirred under one atmosphere of dimethylamine for 17 hours. The silica particles were then suspended in 80 mL of dry chloroform. A four-fold excess of fluoroalkyl-substituted chlorosilane reagent (e.g. 7.0 g FDec-MCS), assuming a maximum grafting density of 4 µmol per square meter, was then added via syringe. The reaction mixture was allowed to stir for three days in a dry nitrogen environment before the fluoroalkyl-functionalized silica particles were recovered by centrifuge and purified by exhaustive Soxhlet extraction in chloroform. The extraction was allowed to proceed for three days in a nitrogen environment to ensure the removal of any non-covalently bound chlorosilane-derived species or other surface contaminants. After the extraction process, the particles were dried in a stream of nitrogen, transferred to vials, and dried at 100° C. under dynamic vacuum for approximately one hour. A typical yield was 2.0-2.5 g of modified silica.

Fluorine elemental analyses were performed by Atlantic Microlab Inc. Nitrogen adsorption-desorption isotherm experiments were conducted at 77 K using a Micromeritics® ASAP® 2020 Accelerated Surface Area and Porosimetry system. Samples were initially degassed at 110° C. for 8 hours under dynamic vacuum. Surface areas were calculated by Brunauer-Emmet-Teller (BET) equation analysis using a nitrogen cross-sectional area of 16.2 square Angstroms. Water uptake of functionalized silica particles was determined by exposing particles to 25° C./90% R.H. in a Tenney® ETCU series environmental chamber for 24 hours, then measuring the weight loss due to water evaporation/desorption using thermogravimetric analysis (TA Instruments® Q5000 IR TGA system). The "wet" samples were heated in a nitrogen environment from room temperature to 100° C. at 10° C./min, held isothermally for 1 hour, and then ramped to 1000° C. at 10° C./min. Weight loss due to heating from room temperature to 100° C. was used for water uptake values, while the weight loss from heating up to 1000° C. was used to determine the thermal stability of the grafted layer and to estimate the graft density. The approximate errors in the measurement techniques were 0.5 wt % for fluorine elemental analysis, 0.5 wt % for thermogravimetric analyses, 1 square meter per gram for BET surface area, 1 (dimensionless) for the BET C constant, and 0.2% for water uptake.

As is evident from Table 1, the choice of chlorosilane did have a significant impact on the performance of the invention. The BET C constant has been recognized as being a good proxy for surface energy, with a roughly linear relationship in which the surface energy in mJ per square meter is equal to the C constant value plus approximately 5, based on measurements of fluorinated compounds with a known surface energy, and in agreement with previously reported work on silicone-treated silica particles. The BET C constant was lowest, by a significant amount, for the FDec-MCS. The FDec-MCS also provided the greatest amount of attached fluorine, which was present in the form of the needed —$CF_2$— and —$CF_3$ molecular fragments, and the least amount of water uptake, thereby allowing the best compatibility with fluoropolymers or fluoroelastomers The BET data also indicated that the particles retained their high specific surface area, thus they retained a complex geometry with roughness at multiple length scales (as confirmed by SEM observation), allowing them to impart a complex nanoscale to microscale texture when included in coating formulations. Because it is known that silane coupling reactions to substrates comprising a combination of a plurality of silica and one or more non-silica metal and/or metalloid oxides form monolayers essentially similar to silica, the trends evident for surfaces containing only silica will also be observed for surfaces containing a plurality of silica in combination with other metal and/or metalloid oxides. In addition, these trends should further extend to substrates consisting only of non-silica materials with properties that are similar to fumed and precipitated silica e.g. a similar hydroxyl density.

Example 2: Comparison of Silane Tail Group Length

In addition to silane head-group functionality, another choice in selecting the appropriate surface treatment was the length of the silane tail group. As mentioned previously, the treated aggregates must possess enough —$CF_2$— and —$CF_3$ molecular fragments to provide good compatibility with fluoropolymers or fluoroelastomers. However, if the size of the silane molecule used in the surface treatment was too large, the geometrical constraints inherent in mesoporous silica may have prevented a high density of grafting, making the choice not obvious based on the prior art. To determine the proper tail length, the same techniques for analysis described in Example 1 were utilized for precipitated silica. In addition, fumed silica (7 nm diameter, 390±40 $m^2/g$ specific surface area), as purchased from Sigma-Aldrich®, was treated in separate batches along with the precipitated silica described in Example 1. The silanes used were FDec-MCS, FOct-MCS, and (3,3,3-trifluoropropyl)dimethylchlorosilane ("FPro-MCS").

According to Table 2, the FDec-MCS provided the highest level of fluorine, and the least water uptake (though in fumed silica, the water uptake was not significantly different for FDec-MCS and FOct-MCS), maximizing compatibility with fluoropolymers and fluoroelastomers. FDec-MCS also provided the lowest BET C constant by a significant margin for precipitated silica, while providing the lowest BET C constant, though not significantly different from FOct-MCS, for fumed silica. These results indicated that FDec-MCS provided the lowest surface energy (as explained in Example 1). Despite their large size, the longer tails resulted in only a modest decrease in BET surface area, indicating that the treated aggregates retained a complex nanoscale to microscale texture and thus the ability to impart said texture to surfaces formed by facile methods of coating substrates.

TABLE 1

Effect of Chlorosilane Choice on Key Properties of Treated Silica Particles

| Sample* | Wt. % F | % Wt. Loss (23-200° C.) | % Wt. Loss (200-1000° C.) | BET Surface Area ($m^2/g$) | BET C Constant | Water Uptake (wt. %) |
|---|---|---|---|---|---|---|
| Prec-Blank | 0.4 | 4.8 | 5.0 | 123 | 127 | 3.7 |
| Prec-FDec-TCS | 6.6 | 4.3 | 16.1 | 128 | 30 | 3.2 |
| Prec-FDec-DCS | 9.0 | 3.5 | 21.2 | 94 | 23 | 3.0 |
| Prec-FDec-MCS | 9.9 | 3.8 | 20.1 | 92 | 21 | 2.8 |

*Prec = Precipitated

Although fumed silica provided slightly higher BET C constants (in a dry state) than precipitated silica, fumed silica resulted in much lower water uptake, thus in the presence of moisture, fumed silica would be expected to retain its low surface energy to a much greater extent. Because the trends seen in Table 2 depend on the geometry of the substrate and the molecular geometry of the silane and because the chemical attachment levels for substrate surfaces containing a plurality of silica among other metal oxides and/or metalloid oxides are known to be similar to those for substrates comprised only of pure silica, the results seen in Table 2 should also apply to substrate surfaces with similar hydroxyl density to fumed and precipitated silica, including substrates comprising a combination of one or more silica materials and one or more non-silica materials, as well as substrates comprising non-silica materials with similar properties.

TABLE 2

Effect of Chlorosilane Tail Length on Key Properties of Treated Silica Particles

| Sample* | Wt. % F | % Wt. Loss (23-200° C.) | % Wt. Loss (200-1000° C.) | BET Surface Area ($m^2/g$) | BET C Constant | Water Uptake (wt. %) |
|---|---|---|---|---|---|---|
| Prec-Blank | 0.4 | 4.8 | 5.0 | 123 | 127 | 3.7 |
| Prec-FPro-MCS | 2.1 | 4.4 | 8.2 | 106 | 29 | 3.4 |
| Prec-FOct-MCS | 7.4 | 4.3 | 16.2 | 101 | 24 | 3.4 |
| Prec-FDec-MCS | 9.9 | 3.8 | 20.1 | 92 | 21 | 2.8 |
| Fum-Blank | 0.0 | 3.9 | 2.6 | 250 | 111 | 2.9 |
| Fum-FPro-MCS | 4.7 | 1.5 | 9.4 | 256 | 29 | 0.7 |
| Fum-FOct-MCS | 13.4 | 1.0 | 21.3 | 187 | 26 | 0.4 |
| Fum-FDec-MCS | 17.5 | 1.6 | 26.9 | 184 | 25 | 0.6 |

*Prec = Precipitated;
Fum = Fumed

Example 3: Fabrication of Fluoroelastomer-Coated Particles

In order to demonstrate that the presently disclosed invention allowed for the creation of coating formulations with a fluoroelastomer that subsequently imparted a complex surface texture and outstanding liquid repellence characteristics to a substrate via a simple coating process, elastomeric composites were produced by dispersing 5 mg/mL of a blend consisting of 50 wt % functionalized fumed silica particles (treated with FDec-MCS as described in Examples 1 and 2) and 50 wt % Viton® Extreme™ ETP-600S fluoroelastomer (a copolymer of ethylene, tetrafluoroethylene, perfluoro (methylvinyl) ether, and bromotetrafluorobutene obtained from DuPont™) into a 5 mg/mL solution of 1,3-dichloro-1,2,2,3,3-pentafluoropropane (AK-225G) solvent. This mixture was then spin-coated onto silicon wafers at 900 rpm for 30 seconds.

Dynamic contact angles for the coatings were measured using a DataPhysics Instruments OCA20 goniometer equipped with a TBU90 tilting stage. Deionized water that was further purified using a Millipore® system was used as a probing liquid for contact angle measurements. Advancing contact angles were measured by dispensing a 4 µL droplet onto a test substrate, then slowly adding water to the droplet through a syringe needle at a rate of 0.2 µL/sec until the droplet advanced on the substrate past 5 µL. This was immediately followed by removing liquid at the same rate until the droplet receded in order to measure the receding contact angle value. The advancing and receding contact angles were measured with an elliptical fit using DataPhysics Instruments droplet fitting software. Three to five experiments were conducted on different areas of each sample with contact angles typically varying by ±2.5°. Roll-off angles were measured by placing a 10 µL droplet onto the test substrate and then slowly tilting the base unit.

Figure 2A:
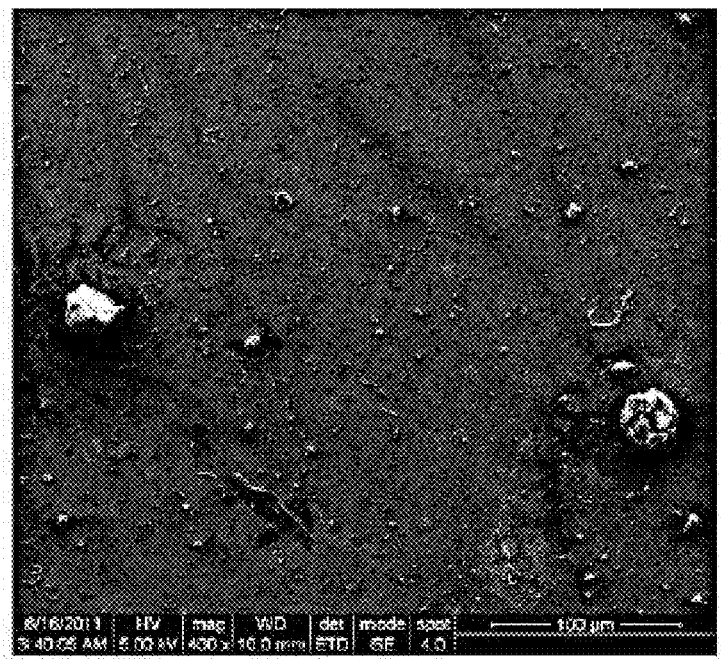
FIGS. 2A-2C are scanning electron microscope (SEM) images of an exemplary superhydrophobic coating taken at three different magnifications.
Figure 2B:
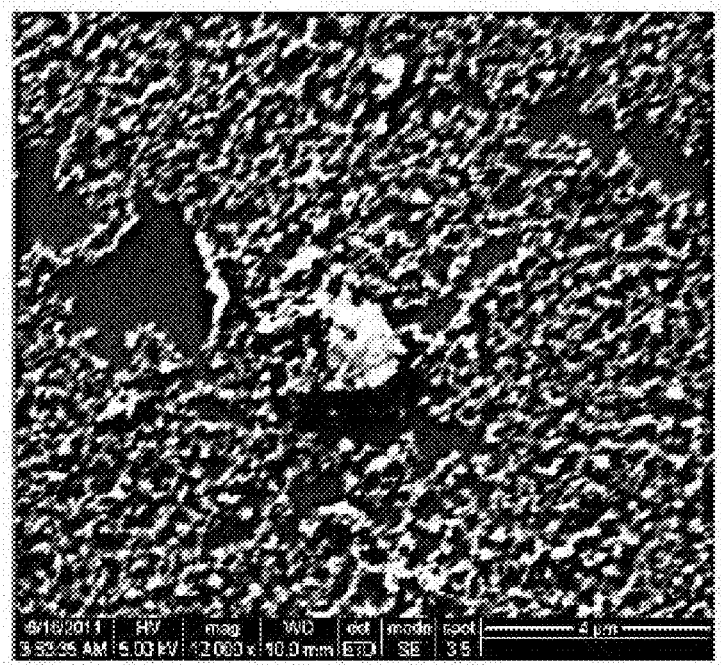
Figure 2C:
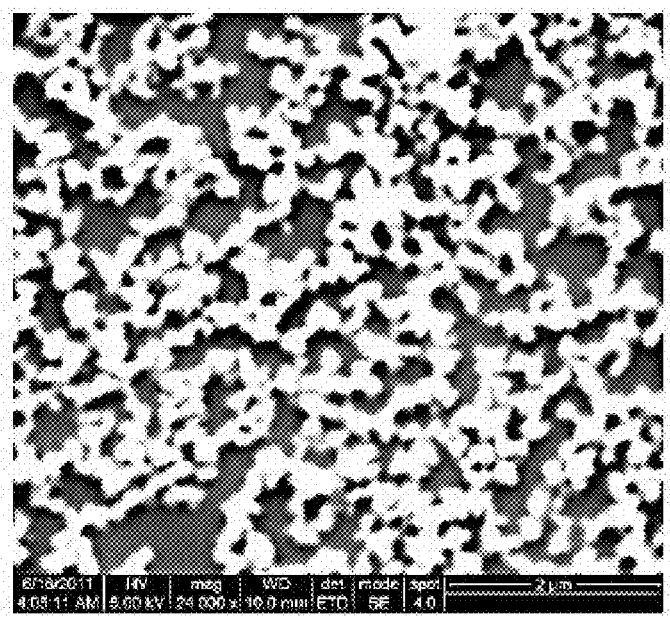

The advancing contact angle of the coating was, on average 160.5° with a standard deviation of 3.5°, while the receding angle was, on average, 160.0° with a standard deviation of 3.4°. These very high contact angles, with a minimal difference between the average advancing and receding angles, are characteristic of superhydrophobicity, a technologically important liquid repellence phenomenon that generally requires both a specific range of surface energy and a specific surface texture to realize in practice. SEM micrographs of this superhydrophobic coating containing the treated fumed silica at magnifications of 400× (FIG. 2A), 12,000× (FIG. 2B), and 24,000× (FIG. 2C) revealed a surface with regularly dispersed sub-micron features that appear to range from 50-500 nm, with occasional aggregates ranging from 2-10 microns. Atomic force microscopy analysis provided additional evidence that the majority of the surface consisted of tightly packed sub-micron features (not shown).

Example 4: FT-IR Analysis of Treated Vs. Untreated Aggregates

Figure 3:
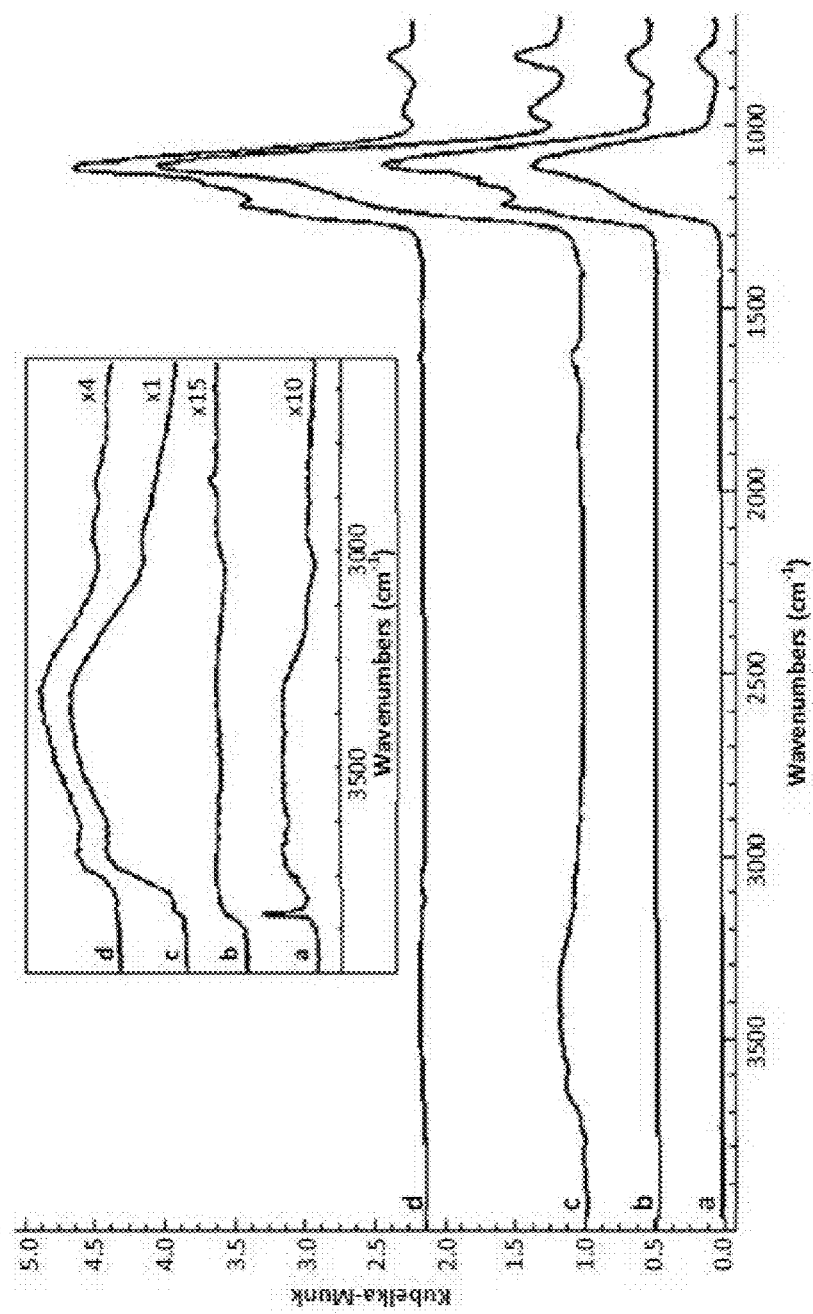
FIG. 3 is a Fourier transform-infrared (FT-IR) of untreated and treated silica aggregates.

An important distinguishing characteristic of the presently disclosed invention is the covalent chemical attachment of a large majority of the fluorinated chemical fragments to the substrate surface. This covalent attachment prevents the slow washing away of the beneficial chemical functionality on periods of extended contact with liquids. To demonstrate covalent bonding, the Diffuse Reflectance Infrared Fourier Transform (DRIFT) spectra of untreated, "as received," silica and FDec-MCS treated silica samples (as described in Examples 1 and 2) was obtained. FIG. 3 shows FT-IR of the untreated and treated aggregates: (a) untreated fumed silica; (b) fumed silica treated with FDec-MCS; (c) untreated precipitated silica; and (d) precipitated silica treated with FDec-MCS. The inset in FIG. 3 is a magnification of the FT-IR data in the range of 3000-3500 $cm^{-1}$ to illustrate the small peaks occurring in this range. The labels (x4, x1, etc.) indicate the factor by which the absorbance scale is magnified in the inset.

The strong narrow band at 3747 $cm^{-1}$ in the spectrum for "as received" fumed silica (a) was indicative of isolated silanols on the outer silica surface. This narrow band was significantly weaker in the precipitated silica spectrum (c), consistent with a heavily hydroxylated silica surface with a large population of vicinal and geminal silanols. Broad overlapping peaks from 3000-3700 cm$^{-1}$ were attributed to these silanol types, both interior and on the surface, as well as surface adsorbed water. Once silanols were substituted with fluoroalkyl substituents, the isolated silanol band was almost completely absent from spectra for both surface types as seen in spectra (b) and (d), indicative of covalent attachment. The formation of siloxane bonds, indicated by the spectral features from 1100-1250 cm$^{-1}$, as well as fine stretches in the fingerprint region, also suggested covalent attachment.

Although specific exemplary embodiments have been described in detail in the foregoing description and illustrated in the drawings, various other embodiments, changes, and modifications to the disclosed embodiment(s) will become apparent to those skilled in the art. All such other embodiments, changes, and modifications are intended to come within the spirit and scope of the appended claims.

What is claimed is:

1. A treated aggregate comprising:
   substrate particles, each comprising:
   a substrate comprising a first metal oxide;
   an outermost surface layer on the substrate, the surface layer comprising a silicon oxide; and
   a molecular layer covalently bound to the surface layer opposite the substrate, the molecular layer comprising a C3-C30 fluoroalkylsilane bound to the silicon oxide,
   wherein the substrate particles, as the aggregate, have a specific surface area of at least 50 square meters per gram, at least 15 parts by weight is fluorine in the form of —CF—, —CF$_2$—, or —CF$_3$, and form concave features having a diameter ranging from about 5 nm to about 1000 nm.

2. The treated aggregate of claim 1, wherein the substrate particles, as the aggregate, have a surface energy of less than 30 mJ per square meter.

3. The treated aggregate of claim 1, wherein the metal of the first metal oxide is selected from the group consisting of Li, Be, B, Na, Mg, Al, K, Ca, Sc, Ti, V, Cr, Mn, Fe, Co, Ni, Cu, Zn, Ga, Ge, Rb, Y, Zr, Nb, Mo, Ru, Rh, Pd, Ag, Cd, In, Sn, Sb, Te, Cs, Ba, Ce, Hf, Ta, W, Re, Os, Ir, Pt, Pb, and Bi.

4. The treated aggregate of claim 1, wherein the substrate of the substrate particles further comprises:
   a second metal oxide.

5. The treated aggregate of claim 4, wherein the metals of the first and second metal oxides are individually and separately selected from the group consisting of Li, Be, B, Na, Mg, Al, K, Ca, Sc, Ti, V, Cr, Mn, Fe, Co, Ni, Cu, Zn, Ga, Ge, Rb, Y, Zr, Nb, Mo, Ru, Rh, Pd, Ag, Cd, In, Sn, Sb, Te, Cs, Ba, Ce, Hf, Ta, W, Re, Os, Ir, Pt, Pb, and Bi.

6. The treated aggregate of claim 1, wherein the C3-C30 fluoroalkylsilane has the formula —Si(CH$_3$)$_m$CH$_2$CH$_2$—(CF)$_n$CF$_3$, wherein the subscript m ranges from 1 to 2 and the subscript n ranges from 5 to 7.

7. The treated aggregate of claim 1, wherein the silicon oxide of the substrate particles is silica.

8. A fluoroalkylsilanated mesoporous particle comprising:
   a substrate comprising a metal oxide;
   an outermost surface layer on the substrate, the surface layer comprising a silicon oxide; and
   a molecular layer covalently bound to the surface layer opposite the substrate, the molecular layer comprising a C3-C30 fluoralkylsilane such that at least 15 parts by weight is fluorine in the form of —CF—, —CF$_2$—, or —CF$_3$.

9. An aggregate comprising:
   a plurality of the fluoroalkylsilanated mesoporous particles of claim 8, the plurality aggregating to form concave features having a diameter ranging from about 5 nm to about 1000 nm.

10. A method of preparing the fluoroalkylsilanated mesoporous aggregate of claim 8, the method comprising:
    providing substrate particles, each comprising the metal oxide and the silicon oxide, wherein surfaces of the substrate particles include the silicon oxide;
    adsorbing an amine onto the surface of the substrate particle at the silicon oxide; and
    reacting a fluorinated chlorosilane with the adsorbed amine.

11. The method of claim 10, wherein the fluorinated chlorosilane is selected from the group consisting of heptadecafluoro-1,1,2,2-tetrahydrodecyl)dimethylchlorosilane, tridecafluoro-1,2,2,2-tetrahydrooctyl)dimethyl-chlorosilane, heptadecafluoro-1,1,2,2-tetrahydrodecyl)methyl-dichlorosilane, and mixtures thereof.

12. The method of claim 10, wherein the silicon oxide is silica.

13. The method of claim 10, further comprising:
    (a) removing a plurality of physically adsorbed water from the substrate particles such that at least one surface hydroxyl group per square nanometer remains intact;
    (b) adsorbing the amine by exposing the substrate particles to an atmosphere containing a concentration of an alkylamine vapor;
    (c) dispersing the substrate particles with the adsorbed amine in a carrier solvent;
    (d) introducing at least a four-fold molar excess of fluorinated chlorosilane;
    (e) reacting the fluorinated chlorosilane with the adsorbed amine by stirring the dispersion for 0.1 to 100 hours;
    (f) removing solvent and excess reagents to yield a treated aggregate; and
    (g) drying the treated aggregate.

14. The method of claim 13, wherein the fluorinated chlorosilane is selected from the group consisting of heptadecafluoro-1,1,2,2-tetrahydrodecyl)dimethylchlorosilane, tridecafluoro-1,2,2,2-tetrahydrooctyl)dimethyl-chlorosilane, heptadecafluoro-1,1,2,2-tetrahydrodecyl)methyl-dichlorosilane, and mixtures thereof.

15. The method of claim 13, wherein the alkylamine vapor is dimethylamine, the method further comprising:
    exposing the substrate particles to the alkylamine vapor for at least 17 hours.

16. The method of claim 13, wherein a time utilized for stirring the inorganic oxide substrate and the fluorinated chlorosilane coupling agent in the carrier solvent is at least 72 hours.

17. The method of claim 13, further comprising:
    continuously extracting non-covalently bound fluorinated chlorosilane for at least 72 hours.

* * * * *